United States Patent
Foreman et al.

[15] 3,676,985
[45] July 18, 1972

[54] POWER-DRIVEN AIR FILTER

[72] Inventors: Christopher Roy Foreman, London; Patricia Violet Shipman, Whitton, both of England

[73] Assignee: Patent Protection Limited

[22] Filed: June 4, 1970

[21] Appl. No.: 43,451

[52] U.S. Cl. ................................ 55/317, 55/400, 55/403, 55/485
[51] Int. Cl. ........................................................ B01d 45/12
[58] Field of Search .................. 55/400, 401, 403, 316, 317, 55/389, 485

[56] References Cited

UNITED STATES PATENTS

| | | | |
|---|---|---|---|
| 3,126,263 | 3/1964 | Schwab | 55/317 |
| 3,123,286 | 3/1964 | Abbott | 55/400 X |
| 3,299,620 | 1/1967 | Hollingworth | 55/485 X |
| 3,091,550 | 5/1963 | Doying | 55/389 X |
| 3,381,453 | 5/1968 | Dills | 55/400 X |

*Primary Examiner*—Robert L. Lindsay, Jr.
*Attorney*—William D. Hall, Elliott I. Pollock, Fred C. Philpitt, George Vande Sande, Charles F. Steininger and Robert R. Priddy

[57] ABSTRACT

A power-driven air filter comprises a cylindrical body of fibrous or cellular material which is rotated on the shaft of an electric motor to cause contaminated air to be drawn into the front and rear faces of the body and pass through the fibrous or cellular material and so be filtered. The rotary body may be formed as a series of readily replaceable face-to-face discs, held on the shaft by push fit retaining members; and an outermost one of the discs is thinner than at least one other of said discs, with the thinner disc being discarded and replaced, when contaminated, in advance of others of said discs. An annular secondary filter in the form of an agglomeration of activated carbon may be arranged around the rotary body.

5 Claims, 3 Drawing Figures

Christopher Roy Foreman
Patricia Violet Shipman
Inventors by Hall, Pollock of Vande Sande

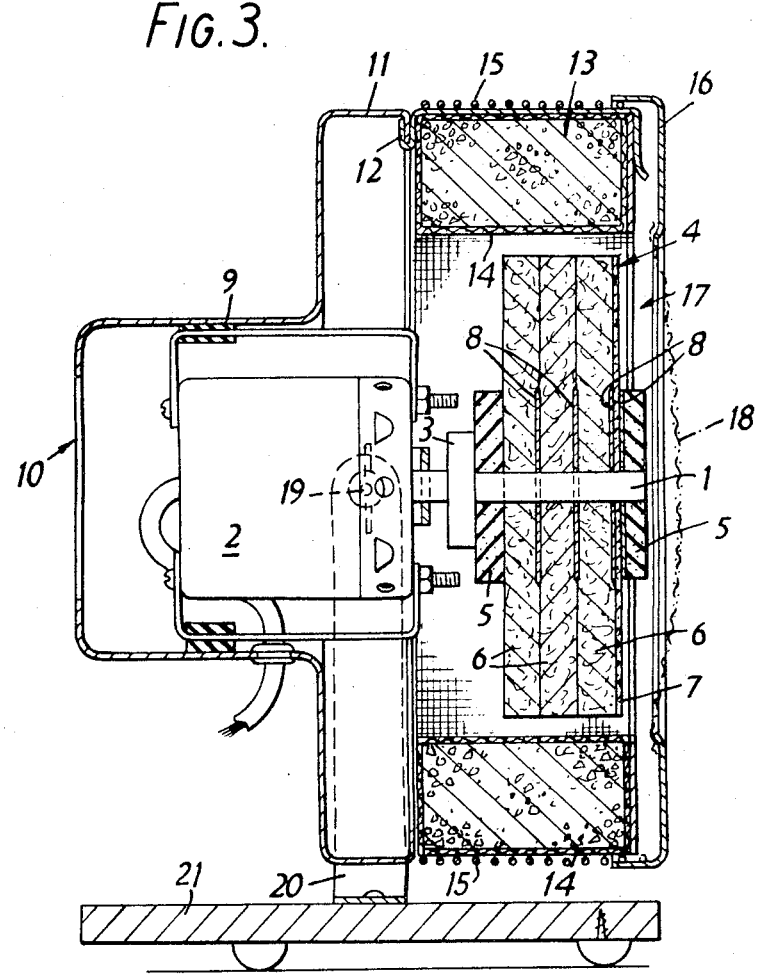

POWER-DRIVEN AIR FILTER

BACKGROUND OF THE INVENTION

This invention relates to power-driven air filters.

Known power-driven air filters of relatively simple form usually comprise a rotary impeller which draws or blows contaminated air through a static filter element of, for example, fibrous or like material or activated carbon granules. These known filters involve various disadvantages, and a very common disadvantage is that a substantial pressure drop occurs across the filter element. This pressure drop is particularly large when air is passed through a fibrous filter element which is sufficiently thick to be effective, and, in the case of filter elements of activated carbon or other particulate material, it is desirable to pre-filter the air through a fibrous filter element which results in a very substantial overall pressure drop. The disadvantage of excessive pressure drop may be largely eliminated in oil-bath filters but these have obvious limitations or in electro-static filters but these are relatively complex and expensive, and it is an object of the present invention to minimize the above and other disadvantages in a relatively simple and inexpensive filter.

SUMMARY OF THE INVENTION

According to the invention, there is provided a power-driven air filter comprising a rotary body of porous or semi-porous material arranged to be rotated to cause contaminated air to be drawn towards one or both end faces of the body and impinge on the body and be at least initially filtered in passing through and/or over said porous or semi-porous material.

In a preferred construction embodying the invention, the rotary body is of generally cylindrical form and formed of fibrous material, and is encircled by an annular filter element through which the initially-filtered air passes under centrifugal action to undergo further filtration. However, on the one hand, the body may be formed of semi-porous material, such as a suitable foam plastic, which effects a relatively small degree of filtration and the surrounding annular filter element is designed to produce a very major part of the total filtration effect; even a closed-cell foam plastic will produce a degree of surface filtration and a reasonable centrifugal blower effect. On the other hand, the rotary body may be formed of a highly effective filtering material such as an open fabric of bonded fibers and the annular filter may be of minimal capacity or may be eliminated.

The rotary body and/or the annular filter may incorporate a medium for deodorizing, medicating, perfuming or humidifying the treated air.

The rotary body will usually be carried on the shaft of an electric motor and may comprise a series of contiguous discs which can be replaced, and the or each outermost disc, which will become contaminated most quickly, may be formed of a different material or thickness.

Other objects and features of the invention will appear from the following description.

DESCRIPTION OF THE PREFERRED EMBODIMENT

Figure 1:
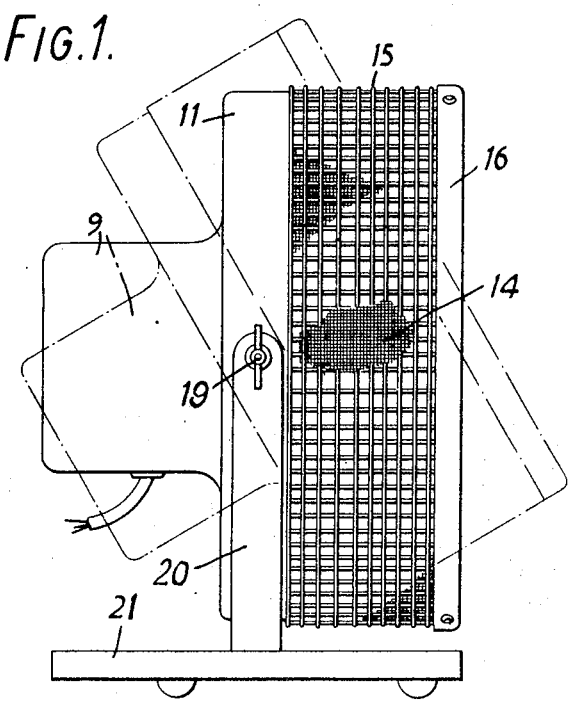
FIG. 1 is a side view showing a power-driven rotary air filter.
Figure 2:
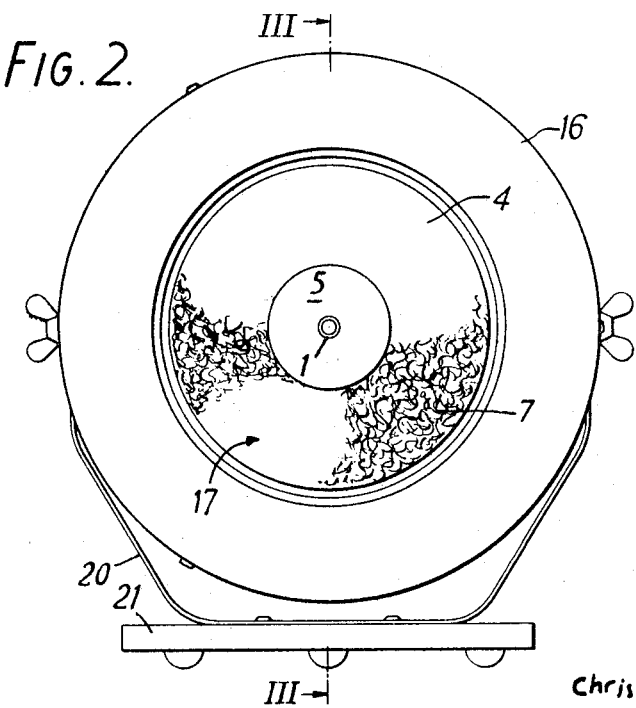
FIG. 2 is a front view corresponding to FIG. 1; and,
FIG. 3 is a vertical section taken on the line III–III OF FIG. 2.

Referring to the drawings, the filter comprises a rotary shaft 1 driven by an electric motor 2 and the shaft is fitted or formed with a collar 3. An initial filter element comprising a rotary body of filtering material, indicated generally at 4, is sandwiched between front and rear rubber discs 5 which are push-fits on the shaft 1 and hold the body 4 frictionally so that the body and the discs turn as a unit with the shaft.

The rotary body 4 comprises three relatively thick discs 6 and a thin front disc 7, arranged in face-to-face contact. The discs 6 and 7 are formed of a resilient fabric carried on cardboard or like inner discs 8; the fabric may have multi-directional bonded fibers, for instance self-bonded acetate fibers, or resin-bonded polyamide fibers, one suitable material being known by the trade name Bondina. This fabric functions only as a mechanical filter, but granules of activated carbon may be incorporated to provide adsorptive filtration and may be bonded to the fibers by a method similar to that described in copending British Pat. application Nos. 42010/69 and 51205/69. In the present method, the activated carbon particles are permeated by an active solvent and any surplus liquid solvent is drained off; the granules are then thoroughly mixed with a relatively small quantity of particulate solid polymer which is rendered adhesive by the solvent absorbed from the granules, and the mixture of granules and particles is admixed with the fibers from which the fabric is formed. After drying off the remaining solvent, the granules are adhered to the fibers and to each other. In an alternative method, a solvent which is active on the fibers or on the fiber-bonding material is employed, and in this case the particulate solid polymer may not be required. It will be appreciated that this method of bonding granules of activated carbon to other materials has a wide range of applications in addition to producing rotary filter discs.

Although four contiguous discs are shown in the drawings, more or less than four may be provided and at least two adjacent discs may be spaced apart and one or more may be of hollow form.

The rotary filtering body 4 and the electric motor 2 are housed in a metal casing comprising a small diameter part 9 formed with an air inlet 10, and a relatively large diameter part 11 to which is secured at 12 an annular filter element 13 formed of activated carbon granules bonded to form a solid body. The element 13 is covered by a filter cloth 14, and enclosed by a cylindrical wire or plastics cage or grill 15 extending from annular front cover 16.

Front opening 17 in the annular cover 16 may be shielded by a wire grill 18 shown in broken lines. The casing 11 is hinged on pivot pins 19 between arms 20 which are mounted on a supporting base 21, so that the unit can be angled to a required elevation.

In operation of the power-driven filter, air is induced as a generally axial flow, primarily through the front opening 17, to impinge on and pass through the filter disc 7 into the discs 6, and also through the rear opening 10 to pass into at least the nearest filter disc 6; the latter air flow also cools the motor 2. The in-flowing air is initially filtered by passing through the discs 7 and 6 and is then discharged outwardly through the circumferential faces of the discs to pass through the outer filter element 13 back into the atmosphere being purified.

The filter described above is of simple and robust construction, and is safe in operation, having no moving blades. The centrifugal "blower" effect of the fibrous discs is surprisingly strong and two-speed control can provide an almost silent but effective slow speed (say 1,400 r.p.m.) and a high speed (say 2,600 r.p.m.) which produces an output equivalent to that of a much larger and more powerful conventional filter. The two-stage filtration effect has also proved to be extremely satisfactory.

It will be appreciated that the discs 6 and 7 can readily be replaced, particularly with the push-on front rubber disc 5. The front disc 7 becomes contaminated much more quickly than the discs 6 and can be replaced more frequently; also, the thin disc 7 is intended to be disposable whereas the thicker and more expensive discs 6 can be cleaned and re-used.

The discs or rings forming the body 4 may include one or more having filtering or air-treatment characteristics different from the remainder, or they may all be identical in these respects, and it will be appreciated that by substituting for any one or more discs or rings (forming part of the body 4) a disc or ring having different characteristics, the air-filtering or treatment properties of the composite filtering body can be changed as desired, e.g., as governed by the nature of matter present in the air or other fluid to be treated.

Further modifications may be made without departing from the scope of the invention. For example, the body 4 has been described as a series of coaxial discs of similar diameter but it may alternatively comprise a one-piece body of cylindrical or annular block form, a roll of filter cloth, a series of coaxial discs or rings of different diameters and possibly spaced apart, an assembly of concentric rings disposed one within another in mutual contact, or a ring supported by an inner carrier of metal or plastic.

Also, although a cylindrical body having a circular section will usually be employed, the section may be of other form, such as square, elliptical, or star-shaped.

In a further alternative, the rotary filtering body 4 may be adapted to encompass the motor 2 and so provide a unit of compact form.

We claim:

1. A power-driven air filter comprising a rotatable shaft, a rotary body of generally cylindrical form mounted on said shaft for rotation therewith, said body comprising a plurality of separate discs extending generally radially of said shaft and mounted in contiguous relation to one another on said shaft, said discs comprising material which is at least semi-porous and having aligned central apertures through which said shaft passes to carry said discs thereon in said contiguous relation to one another, motor means for rotating said shaft and said plurality of discs on the cylinder axis of said body to draw contaminated air toward a radially extending outermost face of said cylindrical rotary body and cause said contaminated air to impinge on said discs and to be at least initially filtered as it passes radially outwards through and/or over said material, an outermost one of said plurality of discs, defining said radially extending outermost face, being thinner in a direction along the cylinder axis of said body than an adjacent thicker one of said discs, and a removable retaining member push fit onto said shaft adjacent to and in surface engagement with the radially extending outermost face of said thinner outermost one of said discs, said thinner outermost disc being readily and individually removable from said shaft by removal of said retaining member from said shaft when said outermost disc becomes contaminated during continued operation of said air filter, for replacement of said outermost disc on said shaft by a clean disc of said material disposed adjacent the thicker one of said discs.

2. The power-driven air filter of claim 1 including an inner supporting annulus attached to each of said discs adjacent the cylinder axis of said body in surrounding relation to the central aperture of said disc for supporting said disc on said shaft.

3. An air filter as claimed in claim 1, in which granules of activated carbon are incorporated in said rotary body.

4. An air filter as claimed in claim 1 and comprising an annular filter element mounted coaxially around said rotary body.

5. An air filter as claimed in claim 4, in which said annular filter element is stationary and comprises a porous agglomeration of activated carbon granules.

* * * * *